US00RE36118E

United States Patent [19]

Cupertino et al.

[11] E Patent Number: Re. 36,118

[45] Reissued Date of Patent: *Mar. 2, 1999

[54] CHEMICAL PROCESS OF SEPARATING METALS FROM AN ORGANIC COMPLEX

[75] Inventors: Domenico C. Cupertino, Pensby; Peter A. Tasker, Edinburgh, both of United Kingdom

[73] Assignee: Zeneca Limited, London, United Kingdom

[ * ] Notice: The term of this patent shall not extend beyond the expiration date of Pat. No. 5,364,452.

[21] Appl. No.: 687,632

[22] Filed: Jul. 26, 1996

Related U.S. Patent Documents

Reissue of:

[64] Patent No.: 5,332,420
Issued: Jul. 26, 1994
Appl. No.: 21,901
Filed: Feb. 24, 1993

[30] Foreign Application Priority Data

Feb. 25, 1992 [GB] United Kingdom ..... 9204018
Feb. 25, 1992 [GB] United Kingdom ..... 9204020

[51] Int. Cl.[6] ..... C22B 11/00

[52] U.S. Cl. ..... 75/710; 75/711; 75/722; 423/24; 423/54; 423/63; 423/70; 423/112; 423/139; 423/157

[58] Field of Search ..... 75/710, 711, 722; 423/24, 54, 63, 70, 112, 139, 157, DIG. 14

[56] References Cited

U.S. PATENT DOCUMENTS

| | | | |
|---|---|---|---|
| 3,854,851 | 12/1974 | Cardwell et al. | 423/24 |
| 4,020,106 | 4/1977 | Ackenly | 260/566 |
| 4,061,564 | 12/1977 | DeSchepper et al. | 210/21 |
| 4,201,747 | 5/1980 | Minagawa et al. | 423/21.5 |
| 4,235,713 | 11/1980 | Nogueira et al. | 210/638 |
| 4,390,366 | 6/1983 | Lea | 423/22 |
| 4,500,494 | 2/1985 | Scher | 423/24 |
| 4,503,015 | 3/1985 | Marr | 423/24 |
| 4,718,996 | 1/1988 | Vanderpool | 75/722 |
| 4,834,951 | 5/1989 | Schwab et al. | 423/24 |
| 4,895,905 | 1/1990 | Schneider | 423/22 |
| 5,049,363 | 9/1991 | Feuling | 423/21.1 |
| 5,258,167 | 11/1993 | Takahashi | 75/710 |
| 5,364,452 | 11/1994 | Cupertino et al. | 75/710 |

FOREIGN PATENT DOCUMENTS

| | | |
|---|---|---|
| 0106118 | 4/1984 | European Pat. Off. . |
| 0148158 | 10/1985 | European Pat. Off. . |
| 2515862 | 10/1976 | Germany . |
| 2615638 | 10/1976 | Germany . |
| 1421766 | 1/1976 | United Kingdom . |
| 1428705 | 3/1976 | United Kingdom . |

*Primary Examiner*—David A. Simmons
*Assistant Examiner*—M. Alexandra Elve
*Attorney, Agent, or Firm*—Pillsbury Madison & Sutro, LLP Intellectual Property Group

[57] ABSTRACT

A method for the recovery of a metal from an organic complex thereof, said method comprising treating the complex with a weakly acid aqueous solution of an alkali metal or alkaline earth metal chloride having a chloride content of at least 4 molar whereby said complex is decomposed and metal ions are transferred to the aqueous solution.

10 Claims, No Drawings

CHEMICAL PROCESS OF SEPARATING METALS FROM AN ORGANIC COMPLEX

Matter enclosed in heavy brackets [ ] appears in the original patent but forms no part of this reissue specification; matter printed in italics indicates the additions made by reissue.

This invention relates to a chemical process and more particularly to a method for the recovery of metals from organic complexes thereof.

The use of organic extractants in the hydrometallurgical recovery of metals from metal ores has been practised commercially for a number of years. In general, the technique involves contacting an aqueous solution of metal salt, obtained for example by treating the crushed ore with acid, with an organic extractant which may be dissolved in a water-immiscible organic solvent or deposited on a porous material or in the form of a chelating resin, to extract the metal from the aqueous solution in the form of a complex of the metal and the extractant.

Since the naturally-occurring ores of valuable metals often contain other less desirable elements, is necessary to employ an extractant which extracts either the valuable metal or the contaminant elements in a selective manner. An example of a process for the selective solvent extraction of a valuable metal such as copper can be found in GB-A-1421766 whilst the selective extraction of contaminant elements such as antimony and bismuth from solutions of copper salts has been described in, for example, DE-A-2515862 and U.S. Pat. No. 4,834,951. The use of chelating resins for the selective removal of antimony and/or bismuth from copper electrolytes has been described, for example, in JP 59-157294, JP 59-162108 and JP 61-110800.

When the metal complex, in solution or solid form, has been separated from the original aqueous solution, it is then necessary to break down that complex so as to recover the metal and regenerate the extractant for recycling. In the process of the aforementioned GB-A-1421766, the copper complex is broken down by contacting the organic phase with a strongly acidic solution containing, for example, 200 grams of sulphuric acid per liter. DE-A-2515662 describes treating the organic phase with a strongly acidic solution and/or with an aqueous solution of a complex-forming hydroxycarboxylic or dicarboxylic acid such as tartaric, citric or oxalic acid to liberate the extractant and the antimony and/or bismuth whilst in the process of U.S. Pat. No. 4,834,951 the contaminant elements present in the organic phase are precipitated as sulphides. For the recovery of antimony absorbed on a chelating resin, elution with 4–6 molar hydrochloric acid has been reported.

In processes where a strongly acidic stripping solution is used, the amount of acid is usually in large excess over that which is required by the stoichiometry of the ion exchange reaction in order to displace the chemical equilibrium so as to liberate most of the metal. It has now been found that such metals can be recovered from their complexes in a facile manner by treating the complex with a weakly acid strip solution containing a high concentration of chloride ion. By a "weakly acid strip solution" is meant a solution containing only a small amount of acid above that required by the stoichiometry of the stripping reaction.

Accordingly, the invention provides a method for the recovery of a metal from an organic complex thereof, said method comprising treating the complex with a weakly acid aqueous solution of an alkali metal or alkaline earth metal chloride having a chloride content of at least 4 molar whereby said complex is decomposed and metal ions are transferred to the aqueous solution.

A particular advantage of the method of the invention is that the metal is obtained in weakly acid aqueous solution so that it can be precipitated, for example as the hydroxide or oxide, by neutralisation of the small amount of acid with a small amount of alkali. The mother liquor from the precipitation can then be readjusted to weak acidity and re-used for further stripping cycles.

The organic complex may be treated in the form of a solution thereof in a water-immiscible organic solvent.

Thus, in one aspect, the invention provides a method for the recovery of a metal from a solution in a water-immiscible organic solvent of an organic complex of said metal by treating the solution with a weakly acid aqueous solution of an alkali metal or alkaline earth metal chloride having a chloride content of at least 4 molar whereby said complex is decomposed and metal ions are transferred to the aqueous solution.

The organic complex dissolved in the water-immiscible organic solvent will generally have been formed by extracting an aqueous solution of metal salt with a solution of organic extractant in the water-immiscible organic solvent. Suitable extractants have been fully described in the prior art (for example by M. J. Hudson, Hydrometallurgy, 9(1982), 149–168) and include all those organic ligands which function via a metal-proton exchange equilibrium (and are usually referred to as ion exchangers) such as alpha-hydroxyoximes, β-diketones, 8-sulphonamidoquinolines, hydroxamic acids, carboxylic acids, esters of phosphoric, thiophosphoric, phosphonic, phosphonous, phosphinic and phosphinous acids and the like.

An especially useful class of extractants comprises organophosphorus compounds of the formula:

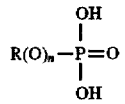

(I)

wherein R represents a branched alkyl radical containing at least 12, preferably at least 16, carbon atoms and which may optionally carry one or more substituents which are inert under the extraction conditions, and n is 0 or 1.

The compounds of Formula I are thus (when n=0) alkylphosphonic acids or (when n=1) mono-alkyl esters of phosphoric acid, the latter being preferred. In some cases, it may be advantageous to use a mixture of compounds of Formula I or, for example, a mixture of a mono-alkyl ester of phosphoric acid, as defined in Formula I, and the corresponding di-alkyl ester.

Typical branched alkyl radicals which my be represented by R in the compounds of Formula I contain from 12 to 40, preferably from 12 to 30 and more preferably from 16 to 24 carbon atoms.

Especially preferred branched alkyl radicals which may be represented by R in the compounds of Formula I are radicals derived from Guerbet alcohols, that is to say radicals of the formula:

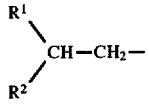

(II)

wherein $R^1$ and $R^2$ are straight-chain or branched alkyl radicals which together contain at least 14 carbon atoms and wherein $R^1$, in general, contains 2 more carbon atoms than $R^2$. Preferred radicals of Formula II include radicals wherein $R^1$ is nonyl and $R^2$ is heptyl, especially the 2-(1,3,3-trimethylbutyl)-5,7,7-trimethyloctyl radical of the formula:

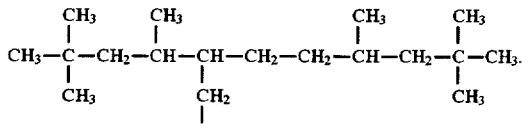

Other useful branched alkyl radicals which may be represented by R in the compounds of Formula I are derived from mixtures of higher alcohols of Formula II wherein $R^1$ and $R^2$ do not necessarily differ by 2 carbon atoms. Such mixed alcohols (for example ISOFOL 18T marketed by Condea Chemie Gmbh) may be obtained by carrying out a Guerbet condensation on mixtures of different alcohols.

Inert substituents which may be present on the branched alkyl radicals include halogen, especially chlorine and bromine, and alkoxy, especially lower alkoxy such as methoxy and ethoxy.

The compounds of Formula I may be obtained by methods described in the prior art for the production of alkylphosphonic acids and mono-alkyl esters of phosphoric acid.

An organic phase comprising one or more compounds of Formula I may be used, for example, to extract antimony and/or bismuth from an aqueous solution in which either or both of these elements may be present. The use of compounds of Formula I is particularly applicable, however, to the selective extraction of antimony and/or bismuth from the highly acidic solutions which are employed as electrolytes in the electrorefining of non-ferrous metals and in which one or both of said elements are present as contaminants. More particularly, compounds of Formula I are valuable for the selective extraction of antimony and/or bismuth contaminants from the highly acidic tankhouse electrolyte solutions used in copper refining. Typical solutions might contain from 35 to 60 g/l copper, from 0.01 to 0.6 g/l antimony and from 0.01 to 0.5 g/l bismuth and have sulphuric acid strengths of from 145 to 210 g/l.

The concentration of organophosphorus compound of Formula I in the organic solvent may be chosen to suit the particular aqueous solution being extracted. Typical concentrations are from about 0.05 to about 1.0 molar, especially from 0.1 to 0.75 molar. Higher concentrations favour more complete extraction of the impurity metals but may reduce the selectivity with which they are extracted.

The water-immiscible organic solvent containing the metal complex will be a good solvent therefor and will be inert under the processing conditions.

Examples of suitable water-immiscible inert organic solvents include aliphatic, cycloaliphatic and aromatic hydrocarbons, chlorinated hydrocarbons such as trichloroethylene, perchloroethylene and trichloroethane and ethers, or mixtures of such compounds. Preferred solvents are hydrocarbon solvents including high flash point solvents with a high aromatic content such as SOLVESSO 150 and AROMASOL H which consists essentially of a mixture of trimethylbenzenes and is commercially available from Imperial Chemical Industries PLC. Especially preferred on grounds of low toxicity and wide availability are hydrocarbon solvents of low aromatic content such as kerosene, for example ESCAID 100 which is a petroleum distillate comprising 20% aromatics, 56.6% paraffins and 23.4% napthenes commercially available from Exxon.

Extraction of an aqueous solution of metal salt with a solution of organic extractant in a water-immiscible organic solvent may be carried out using conventional solvent extraction techniques to provide the solution of metal complex in the organic solvent. Typically, the aqueous solution is intimately contacted, in a single stage or in multiple stages, with the organic phase (for example by agitating the two phases together in a suitable vessel) for a time sufficient to allow substantial extraction of the metal from the aqueous solution, the two phases then being separated in any conventional manner. The extraction may be conveniently effected at ambient temperature but somewhat higher or lower temperatures may be employed if desired or convenient. If desired, the organic solutions may include modifiers, for example tridecanol, known in the art to improve solubility and/or rate of phase disengagement in solvent extraction processes.

Stripping of the metal values from the organic phase may be effected by contacting said organic phase with the aqueous chloride solution using conventional liquid-liquid extraction techniques, either single stage or multistage, followed by a conventional separation. The stripping may be conveniently effected at ambient temperature but somewhat higher or lower temperatures may be employed if desired or convenient.

In a variant of the solvent process, the organic complex is encapsulated within a polymeric film so as to form small spherical particles as described in U.S. Pat. No. 4,500,494 or is present on a porous substrate such as aluminium silicate, magnesium silicate, magnesiumaluminium silicate, aluminium oxide or silica. The complex will generally have been formed by treating the porous substrate with a solution of an organic ligand and then contacting the treated substrate with an aqueous solution of metal salt.

In a further variant, the organic complex is a product of treating an aqueous solution of metal salt with a chelating resin, such resins being known in the art. Thus, the selective removal of bismuth from a copper electrolyte solution containing bismuth, antimony and arsenic using a styrene type strongly basic anion exchange resin (Diaion SA20A available from Mitsubishi Chemical Industries Ltd) has been described in JP 59-157294. The use of a phenolic chelating resin (UR-3300) to remove contaminant metal ions from copper electrolyte solutions has been described in JP 59-162108 and the use of a phosphomethylamine type chelating resin to remove antimony and bismuth from copper electrolyte has been described in JP 61-110800. Examples of commercially available chelating resins useful for removing antimony and/or bismuth ions from copper electrolytes include Duolite C467 (a resin containing groups of the formula $RCH_2NHCH_2PO_3H_2$ wherein R represents a long chain polymer, available from Rohm and Haas S.A.) and Eporous MX-2 (available from Miyoshi Oil and Fat Co Ltd). In other suitable resins, the chelating groups may be, for example, a phosphine, phosphonium, phosphonic acid ester, aminoalkylene phosphate group or the like. Examples of other suitable chelating resins include carboxylic acid types such as Dowex MWC-1, sulphonic acid types such as Dowex HCR-W2, Dowex C-350 or Amberlyst 15, aminocarboxylic acid types such as Purolite A-520 and hydroxyquinoline types such as Schering TN 02328.

Stripping of the metal values from the porous substrate or the chelating resin may be effected by eluting the substrate or resin with the aqueous chloride solution in conventional manner.

The metals which may be recovered by the method of the invention include any metal complexed with an organic complexing agent capable of being stripped with aqueous acid. Examples of such metals include chromium, manganese, cobalt and copper. The method is particularly effective for those metals which, in addition to the above criterion, form complexes with chloride ion in aqueous solution, for example titanium, iron, cobalt, zinc, germanium, arsenic, zirconium, niobium, molybdenum, ruthenium, palladium, silver, tin, tellurium, tantalum, tungsten, osmium, platinum, gold, mercury, lead and, especially; antimony and bismuth.

The weakly acid aqueous solution of an alkali metal or akaline earth metal chloride preferably has a chloride content of at least 5M and suitably has an acid strength of from 0.1M to 0.5M above the stoichiometric requirement for stripping the metal, hydrochloric acid being preferred. Preferred metal chlorides include the calcium and magnesium salts.

The method of the invention is of particular value for the stripping of antimony and/or bismuth from chelating resins on which they have been absorbed or from solutions of organic complexes of said metals in water-immiscible organic solvents, especially solutions of organic complexes of antimony and/or bismuth with organophosphorus compounds. Typical organophosphorus compounds include the phosphoric acid esters described in DE-A-2515862 and compounds of Formula I.

The antimony and/or bismuth may be recovered from the aqueous chloride-containing phase as oxide and/or hydroxide by neutralising the acid.

The invention is illustrated but not limited by the following Examples.

EXAMPLE 1

An aqueous solution (A) containing 0.36 g/l of antimony as its sulphate $Sb_2(SO_4)_3$, 112 g/l of magnesium sulphate and 170 g/l of sulphuric acid was agitated for 1 hour with an equal volume of a solution (B) which was 0.1M in the extractant mono-2-(1,3,3-trimethyl butyl)-5,7,7-trimethyloctyl phosphate in ESCAID 100 solvent. The layers were allowed to separate and settle. Each layer was analysed separately for antimony content. The percentage of the antimony initially present in A which has passed into B was 96%. The resultant loaded organic solution B was then stripped with an equal volume of 5.0M hydrochloric acid. It was found that the antimony passed from the loaded organic solution to the strip solution quantitatively.

Extraction of bismuth by the same extractant was effected from an aqueous medium identical to that of the antimony solution (A) except containing 0.48 g/l of bismuth as its sulphate $Bi_2(SO_4)_3$. The percentage of bismuth extracted into the organic solution B was 50%. The loaded organic solution B was stripped with an equal volume of hydrochloric acid (5.0M). It was found that more than 99% of the bismuth present in the loaded organic solution passed into the aqueous solution.

In a further trial, a loaded organic solution (of organic composition B) containing antimony at a concentration of 0.6 g/l was contacted with an equal volume of an aqueous solution containing 222 g/l of $CaCl_2$, added as its dihydrate $CaCl_2.2H_2O$, and HCl 36 g/l, giving a total concentration of chloride ion of 5M. It was found that 88% of the antimony present in organic solution had transferred to the strip solution.

A transfer of antimony of 80% was found when a portion of the same loaded organic solution as above was contacted with an equal volume of an aqueous strip solution which contained $CaCl_2$ (270 g/l) and HCl (3.6 g/l).

In a further trial, a loaded organic solution (of organic composition B) containing bismuth at a concentration of 0.16 g/l was contacted with an equal volume of an aqueous solution containing 222 g/l $CaCl_2$, added as its dihydrate $CaCl_2.2H_2O$, and HCl 36 g/l, giving a total concentration of chloride ion of 5M. It was found that more than 99% of the bismuth present in the organic solution had transferred to the strip solution.

A transfer of bismuth of more than 99% was also found when a portion of the same loaded organic solution as above was contacted with an equal volume of aqueous strip solution which contained $CaCl_2$ (270 g/l) and HCl (3.6 g/l).

EXAMPLE 2

A 0.5 molar solution of N-(2-ethylhexanoyl) hydroxylamine in kerosene was loaded with antimony by contacting the organic solution with an equal volume of aqueous solution containing 193 parts per million of antimony as it sulphate, $Sb_2(SO_4)_3$, 176 ppm of bismuth as its sulphate, $Bi_2(SO_4)_3$ and 170 g/l of sulphuric acid. The contacting was carried out by vigorous stirring at 60° C. for one hour. The phases were then separated and the organic phase was analysed and found to contain 84 ppm antimony and <1 ppm of bismuth.

Portions of this antimony loaded organic solution were then contacted separately with equal volumes of aqueous strip solutions containing 0.5 molar hydrochloric acid, 5.0 molar hydrochloric acid or 0.5 molar hydrochloric acid and 2.75 moles of calcium chloride. The contacting was carried out for one hour at 60° C. The phases were then separated and each analysed for antimony. The results are tabulated below:

| | concentration of antimony, in parts per million | |
|---|---|---|
| Strip solution | in aqueous phase | in organic phase |
| 5.0M HCl | 81 | 3 |
| 0.5M HCl | <10 | 81 |
| 0.5M HCl + 2.75M $CaCl_2$ | 44 | 34 |

EXAMPLE 3

A 0.25 molar solution of N-(2-ethylhexanoyl)-N-methylhydroxyl amine in kerosene was loaded with antimony and bismuth by contacting one part of solution with five parts by volume of an aqueous solution containing 193 ppm of antimony, 176 ppm of bismuth and 170 g/l sulphuric acid twice, at 60° C. for one hour. The phases were separated and the organic phase was analysed and found to contain 1203 ppm antimony and 12 ppm bismuth.

Portions of this antimony loaded organic solution were then contacted separately with equal volumes of aqueous strip solutions containing 0.5 molar hydrochloric acid, 5.0 molar hydrochloric acid or 0.5 molar hydrochloric acid and 2.75 moles of calcium chloride. The contacting was carried out for one hour at 60° C. The phases were then separated and the aqueous phases analysed for antimony and bismuth. The results are tabulated below:

| | concentration of metal in parts per million | |
|---|---|---|
| Strip solution | Sb | Bi |
| 5.0M HCl | 945 | 12 |
| 0.5M HCl | <10 | <2 |
| 0.5M HCl + 2.75M $CaCl_2$ | 380 | 9 |

The results show that metal loaded hydroxamic acids of the general type $R^3$—C(O)$NR_4OH$, where $R^3$ is a hydrocarbon radical and $R^4$ in hydrogen or a hydrocarbon radical, can be stripped using dilute acid containing high levels of chloride ion.

EXAMPLE 4

Aqueous solutions containing 1 g/l of $Fe^{3+}$, $Zn^{2+}$, $Ni^{2+}$ or $Cu^{2+}$ and having a pH value of 2.0 were made. The metals were taken as their sulphates. Metal-loaded organic solutions containing $Fe^{3+}$, $Zn^{2+}$, $Ni^{2+}$ or $Cu^{2+}$ were separately prepared by rapidly stirring a 0.25 molar solution of the extractant mono-2-(1,3,3-trimethylbutyl)-5,7,7-trimethyl octyl phosphate with an equal volume of one of the aqueous metal solutions mentioned above for one hour at 25° C. The aqueous and organic phases were separated and the organic solutions were each analysed for metals content.

Each of the metal loaded organic solutions was split into two equal portions. One portion of each of the different metal-loaded organic solutions was then contacted with an equal volume of an aqueous strip solution containing 0.5 moles of hydrochloric acid and the other portion with a strip solution containing 0.5 moles of hydrochloric acid and 2.75 moles of calcium chloride. Contacting was carried out by vigorous stirring at 20°–25° C. for a period of one hour. The phases were separated and each analysed for metal content. The results are tabulated below.

| | Strip | Concentration of metal found in parts per million | |
|---|---|---|---|
| Metal | Solution | In the aqueous phase | In the organic phase |
| Fe | A | 7 | 890 |
| | B | 22 | 880 |
| Ni | A | 267 | 100 |
| | B | 363 | 11 |
| Zn | A | 448 | 29 |
| | B | 468 | 2 |
| Cu | A | 583 | 58 |
| | B | 547 | 11 |

Strip solution:
A = 0.5 molar HCl
B = 0.5 molar HCl + 2.75 molar $CaCl_2$

EXAMPLE 5

30 g of a commercially available chelating resin, Duolite C467 (ex - Roman and Haas S.A.), was loaded with antimony and bismuth by contacting the resin with 51 of an aqueous solution containing 0.53 g/l of antimony as its sulphate $Sb_2(SO_4)_3$, 0.46 g/l of bismuth as its sulphate $Bi_2(SO_4)_3$ and 170 g/l of sulphuric acid, with vigorous agitation at 20°–25° C. for 24 hours. The metal-loaded resin was separated and rinsed thoroughly with distilled water to remove traces of the aqueous feed solution. Seven equal portions, of 1 g each, of the metal-loaded resin were separately contacted with 15 ml portions of aqueous strip solutions containing different concentrations of hydrochloric acid between 0.5 and 6 molar. A further seven portions of the metal-loaded resin were separately contacted with 15 ml portions of aqueous strip solutions containing different concentrations of chloride ion between 1.0 and 7.0 molar. The concentration of hydrochloric acid in each strip solution was 0.5 molar. The chloride ion concentration was varied by adding the required amount of $CaCl_2$. The stripping experiments were carried out at 20°–25° C. with a contact time of 2 hours. The aqueous strip solutions were each analysed for metal content with the results tabulated below:

| | Concentration of metal, in parts per million | |
|---|---|---|
| | antimony | bismuth |
| Concentration of hydrochloric acid | | |
| 0.5 | 13 | 222 |
| 1.0 | 54 | 846 |
| 2.0 | 588 | 1602 |
| 3.0 | 2183 | 1848 |
| 4.0 | 2946 | 1885 |
| 5.0 | 3383 | 1964 |
| 6.0 | 3641 | 2033 |
| Total Concentration of chloride ion | | |
| 1.0 | 53 | 728 |
| 2.0 | 104 | 1483 |
| 3.0 | 340 | 1856 |
| 4.0 | 1103 | 2030 |
| 5.0 | 2422 | 2085 |
| 6.0 | 3089 | 2215 |
| 7.0 | 3348 | 2234 |

The results show that, in the case of antimony, dilute acid containing additional chloride ion can effectively strip metal-loaded resins as efficiently as strong acid solutions and in the case of bismuth more efficiently.

EXAMPLE 6

In further trials, 1 g portions of the metal-loaded resin prepared as in Example 5, were separately contacted with 15 ml portions of an aqueous strip solution containing 18 g/l HCl and either 320 g/l NaCl, Solution A, or 203 g/l $MgCl_2$, Solution B. The strip solutions were 6 molar in total chloride ion concentration. The resin was contacted as described in Example 5 and the aqueous strip solutions were analysed for metal content. The results are given in the Table.

| | Concentration of metal, in parts per million | |
|---|---|---|
| Strip solution | antimony | bismuth |
| A | 2925 | 2280 |
| B | 2945 | 2170 |

The results show that $CaCl_2$, used as a source of chloride ions in Examples 1–5, can be satisfactorily replaced by an alkali metal chloride or another alkaline earth metal chloride.

EXAMPLE 7

An aqueous solution containing up to 350 parts per million of each of 13 different metal or metalloids and sufficient nitric acid to give a pH value of 2.0 was made. The metals were taken as their nitrate or acetate salts except for arsenic which was taken as the trioxide. This solution was stirred rapidly with a 0.25 molar solution of the extractant mono-2-(1,3,3-trimethylbutyl)-5,7,7-trimethyloctyl phosphate in kerosene solvent, for one hour at 20°–25° C. The aqueous and organic phases were separated and each was analysed for metals content with the results tabulated below.

| Metal | Concentration of metal found, in parts per million | |
|---|---|---|
| | In the aqueous phase | In the organic phase |
| Iron (III) | <5 | 300 |
| Chromium (III) | 80 | 155 |
| Manganese (II) | 150 | 125 |
| Zinc (II) | 275 | 125 |
| Bismuth (III) | <1 | 105 |
| Nickel (II) | 275 | 35 |
| Arsenic (III) | <5 | 135 |
| Calcium (II) | 180 | 150 |
| Magnesium (II) | 250 | 75 |
| Cadmium (II) | 155 | 135 |
| Silver (II) | 185 | 185 |
| Lead (II) | 25 | 230 |
| Mercury (II) | 333 | <5 |

The results show that at an initial pH value as low as 2.0, iron, bismuth, arsenic and lead are strongly extracted by an extractant of Formula I.

EXAMPLE 8

An aqueous solution (A) containing 0.75 g/l of antimony, 0.135 g/l of bismuth and 170 g/l of sulphuric acid was contacted as in Example 1 with a solution (B) which was 0.1M in the extractant monotridecyl phosphate in kerosene solvent (the tridecyl group is a mixture of branched alkyl groups derived from commercial tridecanol which is a complex mixture of branched primary alcohols). The phases were separated and each layer was analysed for metal content. It was found that the percentages of antimony and bismuth initially present in (A) which passed into (B) were 89% and 41% respectively. The resultant loaded organic solution (B) was then stripped with an aqueous solution which was 0.5 molar in hydrochloric acid and 2.75 molar in calcium chloride. It was found that the antimony and bismuth passed from the loaded solution (B) into the strip solution quantitatively.

We claim:

1. A method for separating a metal selected from the group consisting of chromium, [manganese, cobalt]*cadmium, nickel, calcium, magnesium,* copper, titanium, iron, zinc, germanium, arsenic, zirconium, niobium, molybdenum, ruthenium, palladium, silver, tin, tellurium, tantalum, tungsten, osmium, platinum, gold, mercury, lead, antimony, and bismuth from an organic complex thereof, said method comprising treating the complex with a weakly acid aqueous solution of an alkali metal or alkaline earth metal chloride having a chloride content of at least 4 molar and an acid strength of up to 0.5 molar above the stoichiometric requirement for stripping the metal whereby said complex is decomposed and metal ions are transferred to the aqueous solution.

2. A method according to claim 1 which comprises treating a solution of the complex in a water-immiscible organic solvent.

3. A method according to claim 1 wherein the solution of the complex in a water-immiscible organic solvent is a product of extracting an aqueous solution of metal salt with a solution of organic extractant in the water-immiscible organic solvent.

4. A method according to claim 3 wherein the organic extractant comprises an organophosphorus compound of the formula:

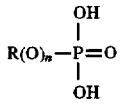

(I)

wherein R represents a branched alkyl radical containing at least 12 carbon atoms and which may optionally carry one or more substituents which are inert under the extraction conditions, and n is 0 or 1.

5. A method according to claim 4 wherein R is a branched alkyl radical containing at least 16 carbon atoms.

6. A method according to [claim 4 or] claim 5 wherein R is a radical of the formula:

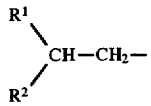

(II)

wherein $R^1$ and $R^2$ are straight-chain or branched alkyl radicals which together contain at least 14 carbon atoms and wherein $R^1$ contains 2 more carbon atoms than $R^2$.

7. A method according to claim 6 wherein R is a radical of the formula:

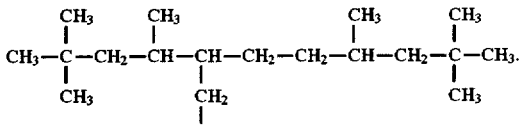

8. A method according to claim 1 wherein the organic complex is a product of treating an aqueous solution of metal salt with a chelating resin.

9. A method according to any one of claims 1 to *5 or 7 to* 8 wherein the weakly acid aqueous solution of alkali metal or alkaline earth metal chloride has a chloride content of at least 5 molar.

10. A method according to any one of claims 1 to [9] *8* wherein the organic complex is a complex of antimony or bismuth.

* * * * *